United States Patent
Arsovski et al.

(10) Patent No.: US 9,870,163 B2
(45) Date of Patent: Jan. 16, 2018

(54) DOUBLE BANDWIDTH ALGORITHMIC MEMORY ARRAY

(71) Applicant: GLOBALFOUNDRIES INC., Grand Cayman (KY)

(72) Inventors: Igor Arsovski, Williston, VT (US); Eric D. Hunt-Schroeder, South Burlington, VT (US); Mark W. Kuemerle, Essex Junction, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 22 days.

(21) Appl. No.: 15/140,016

(22) Filed: Apr. 27, 2016

(65) Prior Publication Data

US 2017/0315738 A1    Nov. 2, 2017

(51) Int. Cl.
*G06F 3/06* (2006.01)

(52) U.S. Cl.
CPC .......... *G06F 3/0619* (2013.01); *G06F 3/0656* (2013.01); *G06F 3/0659* (2013.01); *G06F 3/0689* (2013.01)

(58) Field of Classification Search
None
See application file for complete search history.

(56) References Cited

U.S. PATENT DOCUMENTS

| 8,374,050 B2 | 2/2013 | Zhou et al. |
| 2011/0022791 A1 | 1/2011 | Iyer et al. |
| 2014/0281284 A1 | 9/2014 | Block et al. |

*Primary Examiner* — Kevin Verbrugge
(74) *Attorney, Agent, or Firm* — Anthony Canale; Andrew M. Calderon; Roberts Mlotkowski Safran Cole & Calderon, P.C.

(57) ABSTRACT

The present disclosure relates to memory structures and, more particularly, to double bandwidth algorithmic memory array structures and methods of use. The memory array includes: a plurality of memory banks each of which includes addressable storage units; a redundant array of independent disks (RAID) bank which stores parity bits corresponding to data written into any of the plurality of memory banks at a same address; and a plurality of XOR gates in which data written into any of the plurality of memory banks is cascaded therethrough to refresh the parity bits in the RAID bank.

20 Claims, 6 Drawing Sheets

DOUBLE BANDWIDTH ALGORITHMIC MEMORY ARRAY

FIELD OF THE INVENTION

The present disclosure relates to memory structures and, more particularly, to double bandwidth algorithmic memory array structures and methods of use.

BACKGROUND

Single-port memory is generally characterized by its ability to only read data from or write data to the memory on a single-port. Accordingly, it is not possible to simultaneously read a piece of data from or write a piece of data to the memory at the same time. In other words, a single-port memory can only have single access (read/write) at a time.

Also, double pumped memories are reaching limits on how much improvement can be achieved for reads to a memory array. For example, each RAM has limits to how fast it can be run and hence doubling the frequency with respect to the functional clock has practical limitations in hardware.

To increase memory performance, many manufacturers are now adopting multi-port memory devices. For example, multi-port memories are being widely used in electronic applications in which high-speed data transfer is critical such as data buffering, video processing, data communications, etc. Multi-port memory (e.g., dual-port memory), unlike its single-port memory counterpart, is characterized by its ability to read data from or write data to the memory on one port while simultaneously reading a second piece of data from or writing a second piece of data to the memory on another port. Hence, each port provides a separate independent read and write access path for reading data from the memory, or writing new data into the memory. However, multi-port memory adds to complexity and cost of manufacturing.

SUMMARY

In an aspect of the disclosure a memory array comprises: a plurality of memory banks each of which includes addressable storage units; a redundant array of independent disks (RAID) bank which stores parity bits corresponding to data written into any of the plurality of memory banks at a same address; and a plurality of XOR gates in which data written into any of the plurality of memory banks is cascaded therethrough to refresh the parity bits in the RAID bank.

In an aspect of the disclosure a memory array comprises: a plurality of memory banks each of which includes addressable storage units; a write buffer; a plurality of XOR gates in which data written into any of the plurality of memory banks is cascaded therethrough to the write buffer; and an additional memory bank which stores parity bits corresponding to data written into any of the plurality of memory banks at a same address in subsequent write cycles, as received from the write buffer during a write operation.

In an aspect of the disclosure a method comprises: writing data into a memory bank of a plurality of memory banks; cascading the write data of the memory bank and read data of other memory banks of the plurality of memory banks through a plurality of XOR gates; storing the write data for the memory bank as a parity bit in a write buffer; and refreshing another memory bank with a previous parity bit stored in the write buffer from a previous write operation performed on the memory bank or another memory bank.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to memory structures and, more particularly, to double bandwidth algorithmic memory array structures and methods of use. More specifically, the present disclosure relates to a multi-banked memory architecture with an additional memory bank, e.g., redundant array of independent disks (RAID) bank, and a write buffer. In embodiments, the architecture of the multi-banked memory is designed to perform one write or two reads (1W/2R) per cycle using a dual-port memory architecture which otherwise would be limited to one (1) write and one (1) read per cycle, thereby doubling the bandwidth capabilities for reads of a conventional dual-port memory architecture.

In embodiments, the multi-banked memory architecture described herein can be used in conventional memory bank applications. By way of specific, non-limiting example, the multi-banked memory architecture described herein is well suited for 10 nm dense memories targeting 3G reads/s (e.g., each read at 1.5 GHz), critical for ultra-high end networking space.

In embodiments, the architecture described herein complements a dual-port memory array; however, a N-port memory array (N>1) can also be implemented herein, with the use of additional latches and the logic described herein, as one of skill in the art would understand. For example, the architecture of the multi-banked memory can be expanded to a 2W/2R implementation by simply increasing the number of write buffers and accompanying logic, e.g., XOR gates, muxes, etc. In this way, the architecture of the multi-banked memory can be used to emulate higher multiport applications.

Figure 1:
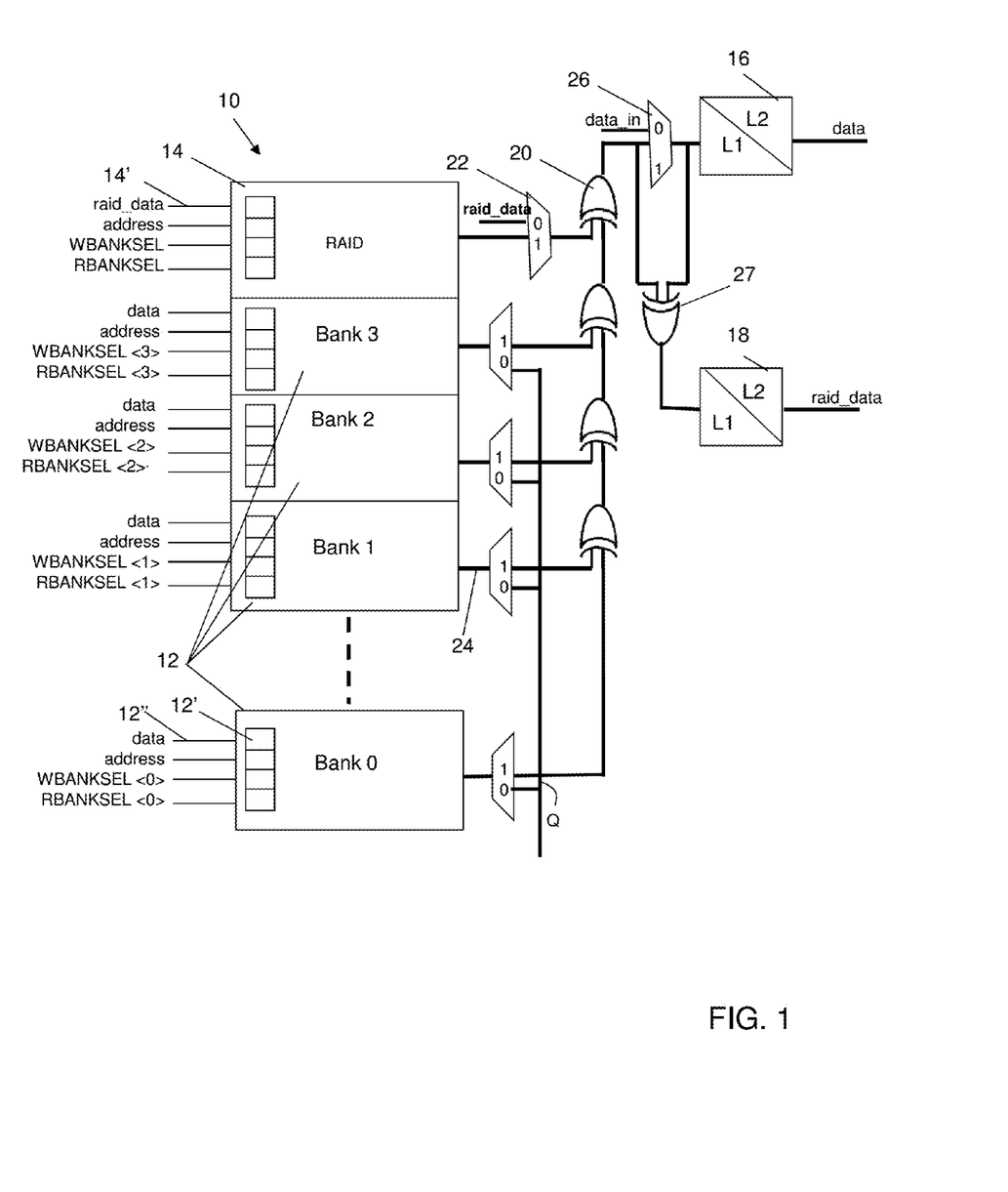
FIG. 1 shows a multi-banked memory architecture in accordance with aspects of the present disclosure.

FIG. 1 shows a multi-banked memory architecture in accordance with aspects of the present disclosure. The multi-banked memory architecture 10 includes a plurality of memory banks 12 and a RAID bank 14. In embodiments, each memory bank 12 is a dual-port memory bank which includes a logical unit of storage units, with each comprising multiple rows and columns generally represented at reference numeral 12'. In alternative embodiments, the memory banks 12 can be N-port memory banks as described in detail herein. Also, although four memory banks are shown in FIG. 1, it should be understood by those of skill in the art that any number of memory banks, N>1, with accompanying logic can be provided in accordance with aspects described herein.

A plurality of signal lines 12" are provided to each of the memory banks 12. These signal lines 12" include, e.g., data line, address line, write bank select (WBANKSEL) and read bank select (RBANKSEL). As should be understood by those of skill in the art, WBANKSEL <n> is a write signal for a selected memory bank <n>; whereas, RBANKSEL <n> is a read signal for a selected memory bank <n> which determines whether a write or a read is occurring in a given bank.

In embodiments, the single RAID bank 14 is a dense memory array which can be identical to the other memory banks 12. In further embodiments, the single RAID bank 14 can be data technology that combines multiple physical disk drive components into a single logical unit for the purposes of performance improvement of the memory bank array. A plurality of signal lines 14' are provided to the RAID bank 14. These signal lines 14' include, e.g., raid_data line, address line, write bank select (WBANKSEL) and read bank select (RBANKSEL), similar to that noted with respect to signal lines 12'. In embodiments, raid_data will receive a parity bit associated with a write operation, from latch L2 of write buffer 18 as further described herein.

In embodiments, the single RAID bank 14 is configured to hold a "parity bit" associated with the data stored at a given address (row, column, etc.) of each of the memory banks 12. That is, in embodiments, the RAID bank 14 is configured to be updated with parity bits ("0", "1") that reflect the new write data (e.g., "0", "1") written into one or more of the memory banks 12 combined with the XOR of the read of the data from all other banks not written. For a given address (row, column, etc.), there may be many bits, i.e., a data word of N bits, in which case the XOR gates, muxes and write buffer would be vectored N times as this logic is on a per bit basis.

During a write operation, a data word is written which is made up of one or more data bits. For each bit in the data word, a parity bit will be generated from the XOR of bit<x> being written with the bit<x> from the read of the other banks. In more specific embodiments, the parity bits of the RAID bank 14 will be updated (refreshed) during write operations of the memory array (e.g., memory banks 12) using data stored in latch L2 of a write buffer 18. As an example, write buffer 18 includes latches L1-L2, i.e., master-slave latch. In embodiments, the latch L1 of the write buffer 18 enables 1 cycle write operations such that data of a subsequent write cycle can be used to update the latch L2 of the write buffer 18 and hence the RAID bank 14 via the raid-data line; that is, the parity bit of the RAID bank 14 can be updated or refreshed with the write data stored in latch L2 of write buffer 18, e.g., at the same address (row and column) of a respective memory bank 12 in which a write operation occurred.

More specifically, during a write operation, new data will be written to one of the memory banks at a given address (row and column). Each bit of this data written to the memory bank ("0", "1") will be combined (XOR operation, e.g., XOR gate 27) with the read of the other N−1 regular banks at the same address (row and column). The result of this operation for each bit will be stored in its own individual latch L1/L2 of the write buffer 18. The latch L2 will be used to update the RAID bank 14 on the next available cycle (to be described below) and also enable one cycle writes as the new parity bit ("0", "1") is available in the write buffer 18 should a double read immediately follow a write at the same address (row and column). In this case, the RAID bank 14 does not have a refreshed parity bit written to the memory array and hence the double read would use MUX 22 to obtain the refreshed parity bit before it is written to the RAID bank. MUX 22 has a select pin with logic to determine when the data should come to the RAID bank 14 or the write buffer.

It should be understood by those of skill in the art, that a parity bit is a bit added to the end of a string of binary code that indicates whether the number of bits in the string with the value one is even or odd. There are two variants of parity bits: even parity bit and odd parity bit. In the case of even parity, for a given set of bits, the occurrences of bits whose value is 1 is counted. If that count is odd, the parity bit value is set to 1, making the total count of occurrences of 1's in the whole set (including the parity bit) an even number. On the other hand, if the count of 1's in a given set of bits is already even, the parity bit's value remains 0. In the case of odd parity, the situation is reversed.

The multi-banked memory architecture 10 further includes a plurality of MUXes 22, 26 and XOR gates 20, 27. In embodiments, the XOR gates 20 can be one less (n−1) than the number of memory banks 12. The number of XOR, MUXes and write buffer is dependent on the data word (number of IO bits) and each IO requires its own independent XOR gates, MUXes and write buffers.

In embodiments, read and write data of each of the memory banks 12 are passed through the respective MUXes 22 via a read local data line 24. The data can be passed from the plurality of MUXes 22 to either an output line Q or cascaded through respective XOR gates 20. In the case of write operation, the write data will be provided to the MUX 26 via a data_in line. The MUX 26, select signal, is controlled by a WRITE signal that will determine that the data is write data provided during a write operation and will pass this write data to the latches L1/L2 of the write buffer 16. In the case of simultaneous write and read operations, the read data will pass to the XOR gate 27 with the write data first passing through the MUX 26 and then through the XOR gate 27 for updating the latches L1/L2 of the write buffer 18, e.g., parity bits of the write data can be stored in the latches, from each of the different memory banks 12 as obtained during the write cycle. In a subsequent write operation, the write data in latch L1 will update latch L2 of the write buffer 18, which is then used to update the RAID bank 14, via the raid_data line.

By way of an illustrative non-limiting operational example of a memory array that is only a single bit wide. In a first write operation of the memory bank array, e.g., write operation for bank 1, the write data (e.g., "0", "1") will be combined with the data from read operations of the other banks (e.g. bank 0, bank 2, bank 3) through XOR gates 20 and XOR gate 27, and be stored in the latch L1 of write buffer 18 as a parity bit (e.g., "0", "1"). The new parity bit in latch L1 of write buffer 18 will eventually be written to the RAID bank 14 on a future cycle (e.g., no operation, single read, single write) through the raid data line.

In a second write operation, the new write data (e.g., "0", "1") written into one of the memory banks 12, e.g., memory bank 2, will be combined with the data from read operations of the other banks (e.g. bank 0, bank 1, bank 3) through the XOR gates 20 and XOR gate 27, and be stored in the latch L1 of the write buffer 18 as a parity bit (e.g., "0", "1"), while the previously stored parity bit passes into the latch L2 of the write buffer 18. In this cycle, the parity bit that was passed to the latch L2 of the write buffer 18 will update or refresh the RAID bank 14 in the same way that a normal write would occur to a regular bank. In this way, write data for a certain row and column of a particular memory bank 12 passed to latch L2 of the write buffer 18 can be used to refresh or update the parity bit in the respective location in the RAID bank 14, which can be used in subsequent read cycles. Accordingly, the RAID bank 14 can now match write data written into one or more of the memory banks 12.

It should be understood by those of skill in the art that the parity bits of the RAID bank 14 need not be updated during read operations. Also, although this simple example discusses a data word of length 1, it should be understood by those of skill in the art that data words of length much greater than 1 could be used. In these cases, each bit requires its own independent XOR gates, MUXes and write buffer as should be understood by those of skill in the art.

Accordingly, and still referring to the architecture 10 of FIG. 1, if there are two reads or a write, WBANKSEL<x> will fire based on the bank address latches, with a bank select launched off a command clock. If writing to a particular memory bank 12, e.g. bank 0, all other banks will be activated for read, e.g., WBANKSEL <3:0>=0001, RBANKSEL <3:0>=1110, where a "1" means the bank is selected for write or read. If performing two reads, the WBANKSEL will be used as the second read bank address but in some implementations, additional input pads dedicated for double reads could be assigned to the memory. If there is a match signal, i.e., two reads to the same bank on a given cycle, then all other RBANKSELs will fire plus the redundant RAID bank 14. Also, the MUX 26 will be set to switch to the second path, which feed out through the XOR gate 27 and out to the write buffer 18, if WRITE=1 (e.g. a write is being performed).

The architecture 10 of FIG. 1 can also be used to verify the quality of the read data by comparing the read data of a memory bank at a specific row and column to the parity bit that is stored in the RAID bank 14 at the same specific row and column. This is accomplished by reading a given bank, e.g. bank 0, and also issuing a double read to bank 0 for the same address (row and column). A second read will occur to all other banks, e.g. bank 1, bank 2, bank 3 and the RAID bank 14. The data out of these banks will be sent through the XOR path and can be compared to the data out of bank 0. If the two match, no soft error occurred and the read was successful and correct. In FIG. 1, the mux 22 would be configured such that the data out of RAID bank 14 is placed on the XOR tree and not the input RAID_DATA unless the write buffer 18 contains the latest parity bit from a write cycle on the previous cycle.

In this way, it is possible to use the architecture 10 of FIG. 1 to detect whether a soft error occurred (bit was flipped). More specifically, the architecture 10 of FIG. 1 can determine that no error occurred when the read data from the memory bank 12 matches the parity bit in the RAID bank 14 for a same address. In more specific embodiments, soft error detection can be accomplished by reading the memory bank 12 with READ1 on port1 and comparing the result with all other memory banks 12 (including RAID bank 14) with READ2 on port2. Since the RAID bank 14 holds the parity of all other banks 12, it is possible to detect single errors.

Table 1 below shows an example of parity protected read operations. Referring to Table 1, even parity is provided if the number of 1's in the data is odd, whereas, odd parity is provided if the number of 1's in the data is even. Parity bit equaling 1 can be used to make the total number of 1's an even number or an odd number.

TABLE 1

| 4 bits of data | (count of 1 bits) | 5 bits including parity | |
| --- | --- | --- | --- |
| | | even | odd |
| 0000 | 0 | 00000 | 00001 |
| 1010 | 2 | 10100 | 10101 |
| 1101 | 3 | 11011 | 11010 |
| 1111 | 4 | 11110 | 11111 |

FIGS. 2A-2I show exemplary read and write operational cycles implementing the architecture and logic of FIG. 1, in accordance with aspects of the present disclosure. In these examples, in a single write operation, a write will update the RAID bank 14 with a refreshed parity bit. In the presently described solution, the write data and all the read DOUT is XORed for the same address. This requires reading all other memory banks, with the result stored in a "write buffer" and updates provided to the RAID bank 14 on the next cycle.

Figure 2A:
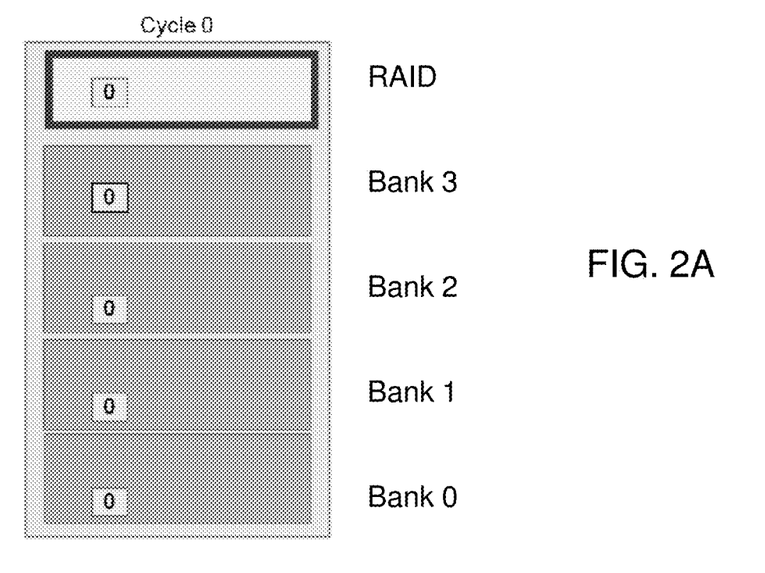
FIGS. 2A-2I show exemplary operations of read and write cycles using the architecture of FIG. 1, in accordance with aspects of the present disclosure.

In these illustrative examples, eight (8) read/write cycles will be discussed, with the assumption that the memory array, e.g., memory banks 0-3, is initialized to a known state in cycle 0. Specifically, as shown in FIG. 2A, in cycle 0, all of the rows and columns are set to "0". For simplicity, a data word of length 1 is shown, e.g., each write or read is only a single bit wide; however, one skilled in the art would understand that this example could be extended to potentially many bit data words and more banks. The latches L1/L2 of the write buffer 18 and RAID bank 14 are also set to "0". As should be understood by those of skill in the art, the RAID bank 14 does not require refreshing during read only operations.

Figure 2B:
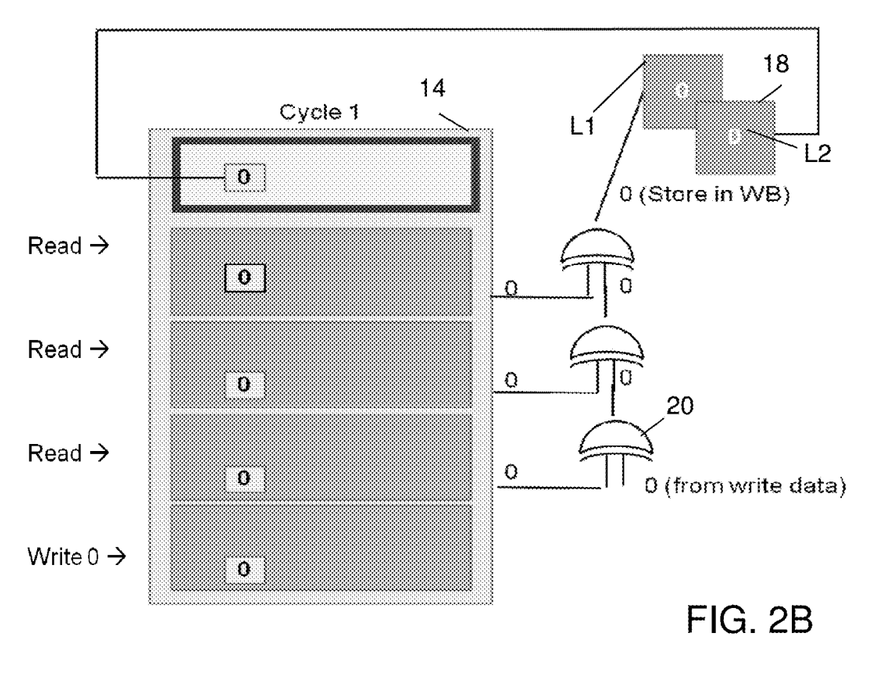

In FIG. 2B, in cycle 1, a write operation occurs in bank 0 (WBANKSEL<3:0>=0001), e.g., "0" is written to bank 0, row 0, col. 0, with the remaining banks 1-3 having a single read operation, e.g., banks 1-3 are read (RBANKSEL<3:0>=1110) and the data stored e.g., a "0" at the same column and row (e.g., row 0, col. 0) is sent to the XOR gates 20. The new data written, "0" is fed into the XOR gate (e.g., XOR gate 27 shown in FIG. 1) through the mux 26 passing data_in and combined with the read data out through the XOR gate. The result of these operations are ultimately stored in the write buffer 18. To be clear, during a write, the bank being written is immediately updated with the new data; however, the RAID bank 14 is not refreshed until a future available cycle, but rather the new parity bit is stored in the write buffer 18 enabling one cycle write operations.

As should be understood, in a single read operation, no additional logic would be required; instead, the address is provided and read operation occurs. In this scenario, though, the RAID bank 14 can be updated with write buffer data if a write occurred in the previous cycle. The new parity bit in the write buffer 18, e.g., latch L2, will then be stored in the RAID bank 14 at the same address. In this way, raid_data will update the RAID bank 14 on a next available cycle. In order to know which address to update in the RAID bank 14, pipelining of addresses is required. During a write, the write addresses (row, column, etc.) will be pipelined so that on the next available clock cycle the RAID bank 14 at the same address (row, column, etc.) may be correctly updated based on the raid_data in latch L2 of the write buffer 18.

More specifically, in this cycle, the read and write data is cascaded through the XOR gates 20 (which is also representative of XOR 27 of FIG. 1), with the resultant parity bit of the write operation stored in the latch L1 of write buffer 18. Any previously stored data in latch L1 of 18 will be passed to latch L2 of write buffer 18 and stored as a parity bit in the RAID bank 14 for the particular address (row and column) of a particular memory bank. In this case, the parity bit "0" previously stored in latch L1 of write buffer 18 will be used to update the RAID bank 14, as it passes through and is stored in latch L2 of write buffer 18.

During a single read operation, e.g., no double reads in a single banks, there is no need to access the RAID bank 14 and the read output can be provided directly to output line Q. In other words, when a bank address collision is not detected, the output from the other banks would simply supply 0 to the XOR stack, leaving the output unchanged. During a write operation, Q is not updated. Q is data out and is updated during reads. This is valid for a single read and should be moved to a single read cycle. A double read to two different banks can be done by the first read putting data out on Q and the second read going through the XOR stack 20 and through latch 16, i.e., the data in latch is reconfigurable to send out data out as well as accept data_in.

Figure 2C:
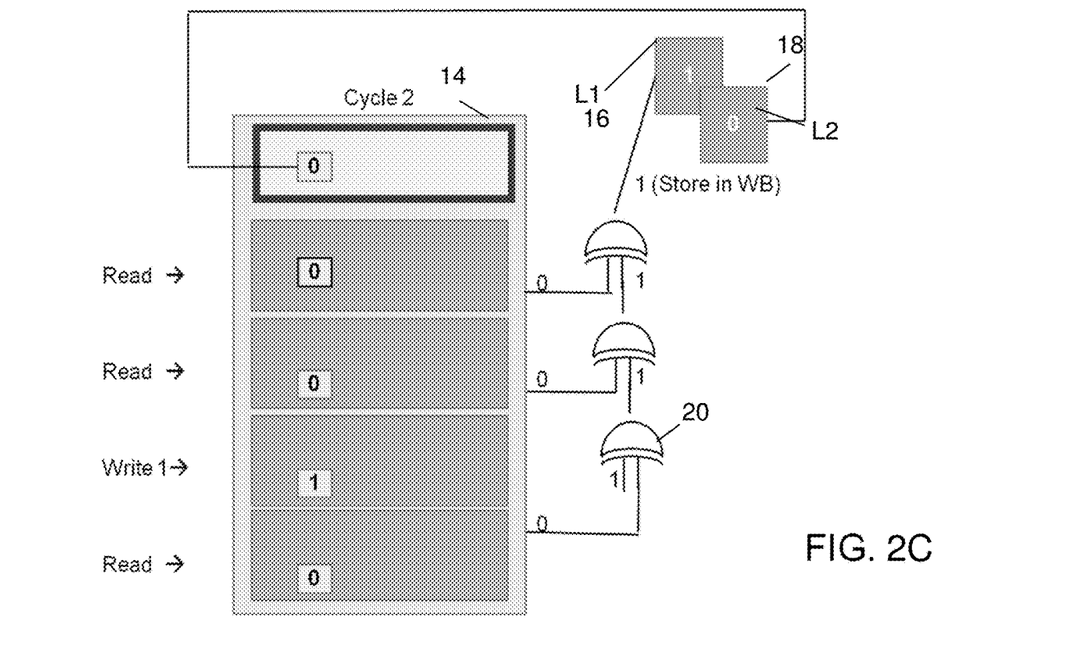

Similarly, in FIG. 2C, in cycle 2, a write operation occurs in bank 1, e.g., "1" is written to bank 1, row 0, col. 0, with the remaining banks 0, 2 and 3 being read with data "1", "0", "0", respectively, at the same column and row (e.g., row 0, col. 0). In this cycle, the read and write data is cascaded through the XOR gates 20 (which is also representative of XOR 27 of FIG. 1), with the resultant parity bit (i.e., "1") of the current write operation stored in the latch L1 of write buffer 18. In this scenario, the parity bit "0" of the last write cycle stored in latch L1 of write buffer 18 will be passed to latch L2 of write buffer 18 which, in turn, writes the RAID bank 14 at row 0, column 0.

Figure 2D:
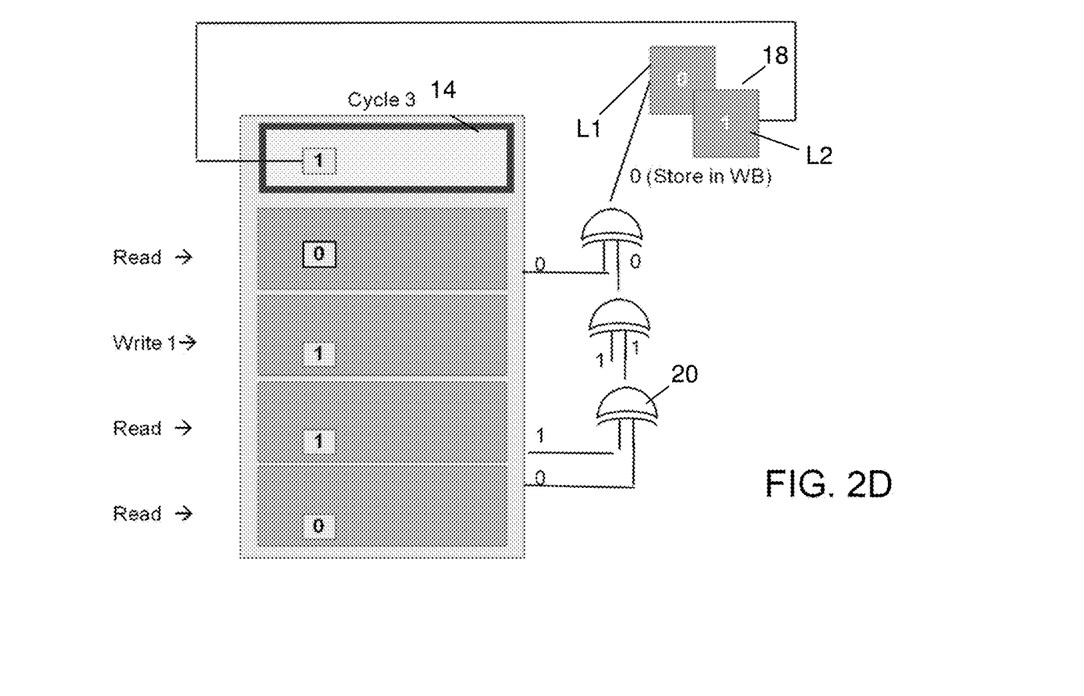

Similarly, in FIG. 2D, in cycle 3, a write operation occurs in bank 2, e.g., "1" is written to bank 2, row 0, col. 0, with the remaining banks 0, 1 and 3 being read with data "0", "1", "0", respectively, at the same column and row (e.g., row 0, col. 0). In this cycle, the read and write data is cascaded through the XOR gates 20 (which is also representative of XOR 27 of FIG. 1), with the resultant parity bit (i.e., "0") stored in the latch L1 of write buffer 18. In this scenario, the parity bit "1" of the last write cycle stored in latch L1 of write buffer 18 will be passed to latch L2 of write buffer 18 which, in turn, updates/refreshes the RAID bank 14.

Figure 2E:
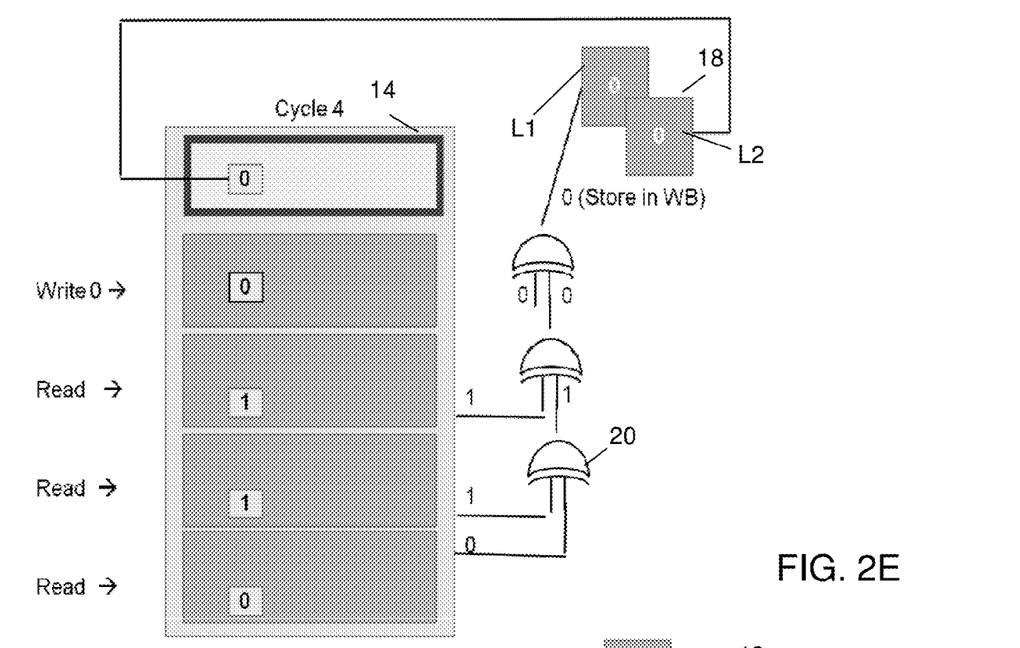

In FIG. 2E, in cycle 4, a write operation occurs in bank 3, e.g., "0" is written to bank 3, row 0, col. 0, with the remaining banks 0-2 being read with data "0", "1", "1", respectively, at the same column and row (e.g., row 0, col. 0). In this cycle, the read and write data is cascaded through the XOR gates 20 (which is also representative of XOR 27 of FIG. 1), with the resultant parity bit (i.e., "0") stored in the latch L1 of write buffer 18. In this scenario, the parity bit "0" of the last write cycle stored in latch L1 of write buffer 18 will be passed to latch L2 of write buffer 18 which, in turn, updates/refreshes the RAID bank 14.

Figure 2F:
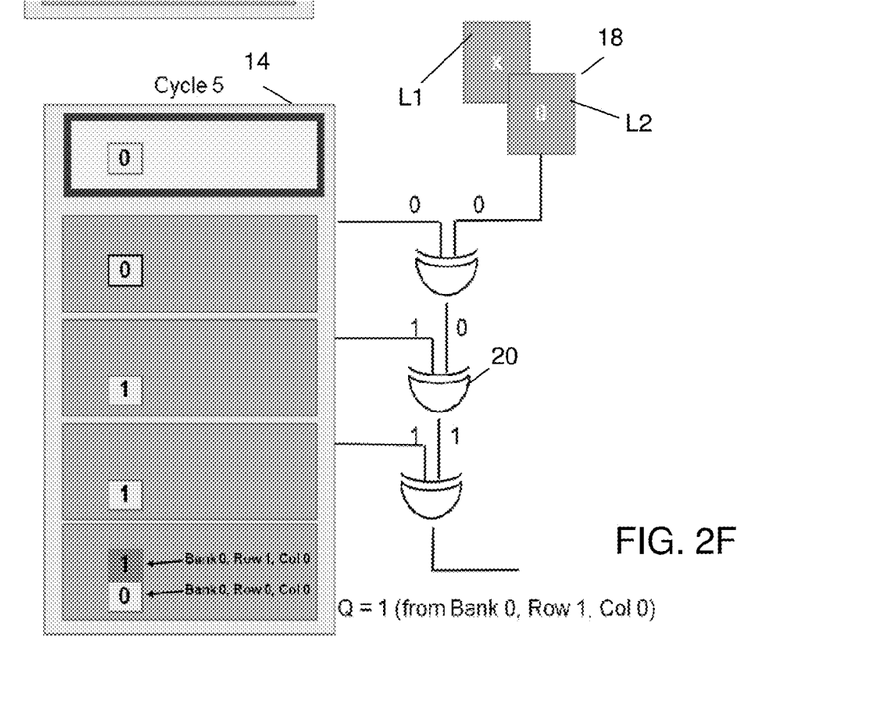
Figure 2G:
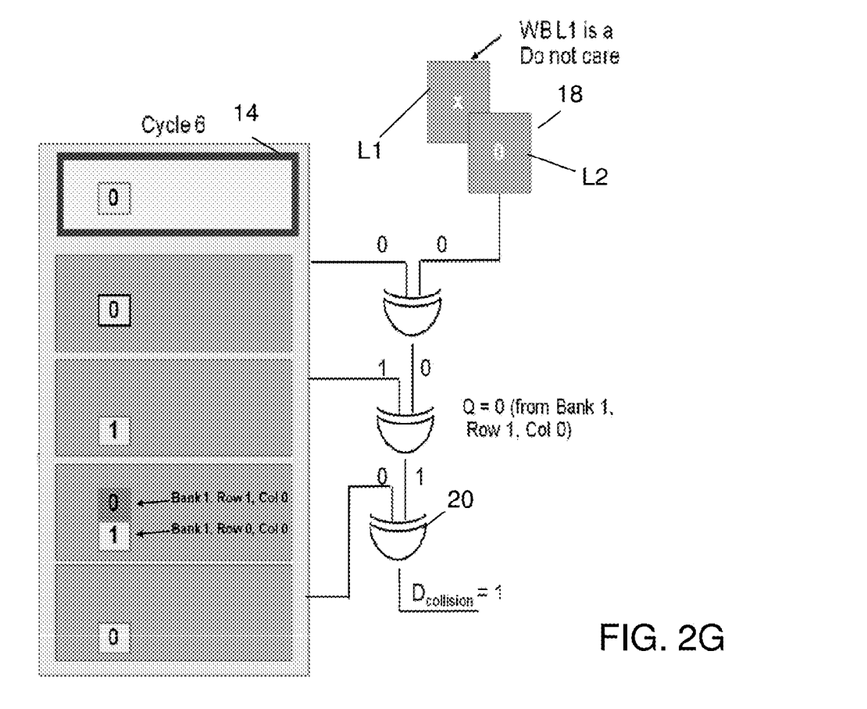

In FIG. 2F, in cycle 5, there is a double read in bank 0, e.g., row 0, col. 0 and row 1, col. 0. That is, the bank 0 has a double read with a collision, e.g., two reads in the same bank. In this situation, row 0, col. 0 has read data "0" and row 1, col. 0 has read data "1". In a two read operation, the first read proceeds normally in the memory bank which is specified as a read, with data sent out of Q. The second read, though, requires reading all other banks including the RAID bank 14 in some situations, and XORing all of the results with that of the data stored in the latch L2 of write buffer 18 since the RAID bank is out of sync with the refreshed parity (i.e., a write occurred and RAID bank hasn't been written). The result of this cascaded XOR is the dataout for the bank read, e.g., a "0". The data in latch 16 is loaded with the second read data out and the hence this latch is reconfigured to be a data out latch, providing the second read data out. Accordingly, by reading all other banks and the data stored in the write buffer it is now possible to determine what the correct data out should be at the output. Since the RAID bank 14 had stale data, e.g., the refreshed parity bit was stored in latch L2 of write buffer 18 from a write on the previous cycle and the RAID bank 14 has yet to be refreshed, the data from latch L2 of write buffer 18 would be sent through the XOR in place of the data from the RAID bank 14.

In order to determine if the RAID bank 14 or the write buffer 18 (latches L1/L2) needs to be used during a double read, the addresses should be pipelined and a comparison should occur of the pipelined write addresses with the new double read addresses to the memory. If a double read follows a write and the addresses from the previous cycle write match the double read addresses (e.g., row, column, etc.) the latch L2 of the write buffer 18 should be used instead of reading the RAID bank 14 as the parity bit in the RAID bank is outdated.

More specifically, in this cycle, it is assumed that the first read will be row 1, col. 1, which will result in an output of "1" on Q (data out latch). For the second read, though, it will be necessary to consult the write buffer, e.g., latch L2 of write buffer 18, for determination of the data bit, as the RAID bank 14 has not been updated. By way of example, by reading the banks 1-3 and the latch L2 of write buffer 18, it can be determined that row 0, col. 0 of bank 0 is a "0". Also, data in the write buffer, e.g., latch L2 of write buffer 18, would not be written to the RAID bank 14, in this scenario, but instead held through the cycle. Thus, in this scenario, if a read follows a write to the same address on the next cycle, the result should consult the write buffer, e.g., latch L2 of write buffer 18, instead of RAID bank 14 which would be out of date. The data out from the second read is latched in latch 16 as this latch will be reconfigured as a data out latch during a double read and a data in latch during a write.

In embodiments, a mux select pin (MUXSELP) signal can select a respective memory bank, e.g., bank 0, in order to reconstruct previously written data (0, 1) on the memory bank, e.g., bank 0, by consulting the latch L2 of write buffer 18. That is, in this scenario, the mux select sends the data (raid_data) in the write buffer on the local data lines; instead of selecting the RAID bank 14 which potentially has the incorrect data. Accordingly, in the double read scenario, data is grabbed from the write buffer 18, e.g., latch L2 of write buffer 18, and not the RAID bank 14 as write data (e.g., parity bit) has not been written into the RAID bank 14. In this particular situation, for example, bit "1" from row 0, col. 0 of bank 1, bit "1" from row 0, col. 0 of bank 2 , bit "0" from row 0, col. 0 of bank 0, and the parity bit "0" in latch L1 of write buffer 18 is cascaded through the XORed gates 18 resulting in data bit "0" for the row 0, col. 0 of bank 0.

As should this be understood in view of the above, in the double read situation, as is shown in FIG. 2F, the latches L1/L2 of write buffer 18 will hold data until the next available clock cycle to update RAID bank 14 during a subsequent write operation. Thus, if there is a double read, pipelined addresses which are used to update the RAID bank 14 will not be clocked, thereby holding the parity bit in the latches, until the next clock cycle with a write operation.

In cycle 6 shown in FIG. 2G, there is again a double read, now in bank 1, e.g., row 0, col. 0 and row 1, col. 0. In this situation, row 0, col. 0 has read data "0" and row 1, col. 0 has read data "1". In this cycle, it is assumed that the first read will be row 1, col. 0, which will result in an output of "0" on Q out through data out latches, as in a normal read. For the second read, though, it will be necessary to consult the write buffer 18, e.g., latch L2, as the RAID has still not been updated (e.g., the RAID bank has not been refreshed). By way of example, by cascading the data in banks 0, 2 and 3 at a same address (row 0, column 0), with the parity bit latch L2 of write buffer 18, it can be determined that row 0, col. 0 of bank 1 is a "1", in a similar fashion as described above with respect to FIG. 2F.

Figure 2H:
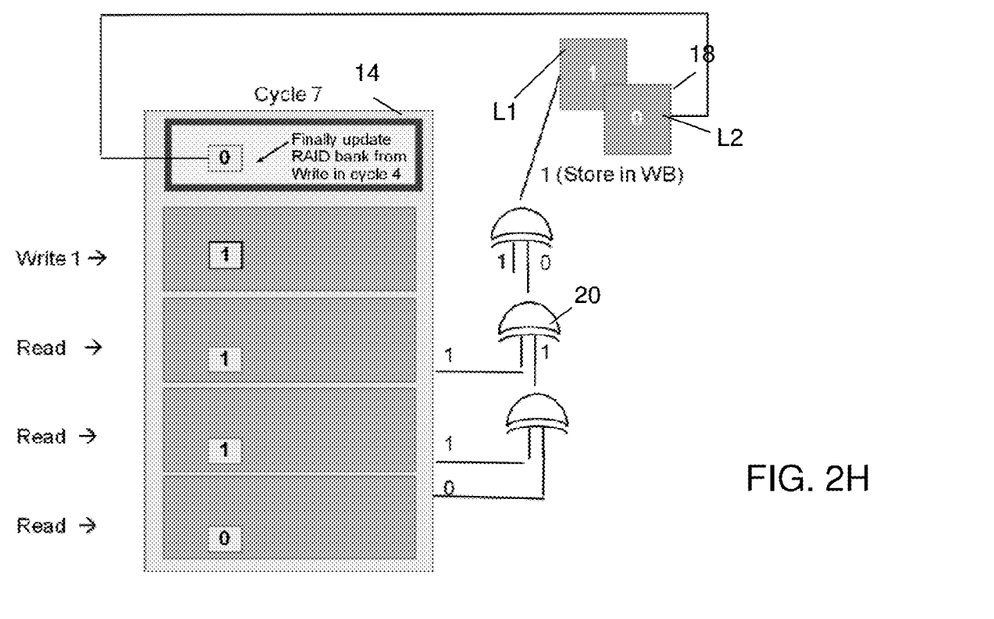

In FIG. 2H, in cycle 7, a write operation occurs in bank 3, e.g., "1" is written to bank 3, row 0, col. 0, with the remaining banks 0-2 being read with data "0", "1", "1", respectively, at the same column and row (e.g., row 0, col. 0). In this cycle, the read and write data is passed through the XOR gates 20 (which is also representative of XOR 27 of FIG. 1), with the resultant parity bit (i.e., "1") of the current write operation stored in the latch 16. In this scenario, the parity bit "0" of the last write cycle stored in latch L1 will be passed to latch L2 of write buffer 18 which, in turn, updates/refreshes the RAID bank 14. Here, the RAID bank 14 is updated with the write data of cycle 4 as the resources required to write the RAID bank are free.

Figure 2I:
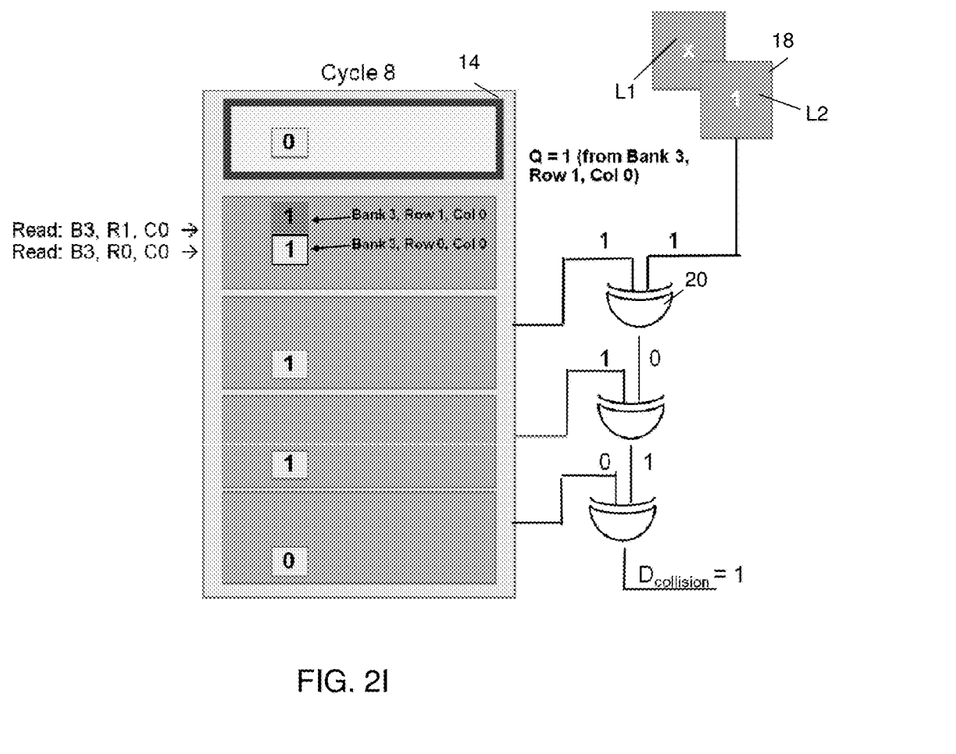

In cycle 8 shown in FIG. 21, there is a double read in bank 3, e.g., row 0, col. 0 and row 1, col. 0. In this situation, row 0, col. 0 has read data "1" and row 1, col. 0 has read data "1". In this cycle, it is assumed that the first read will be row 1, col. 1, which will produce an output of "1" on Q out through data out latches, as in a normal read. For the second read, though, it will be necessary to consult the write buffer, e.g., latch L2, as the RAID bank 14 has not been updated. By way of example, by reading the banks 0-2, and the latch L2 of write buffer 18 and cascading this data through the XOR gates 18, it can be determined that row 0, col. 0 of bank 3 is a "1", in a similar fashion as described above with respect to FIG. 2F.

Accordingly, in view of the above, it should now be understood that in a single write operation, it can be assumed that all bits in the memory are in a known state, including the RAID bank 14. In this scenario, each write only needs to be XOR'ed with the RAID bank 14, thus providing power savings. The RAID bank 14 can then be read, and XORed with new write data. The result is stored in the write buffer 18 with updates in the RAID bank 14 on the next available cycle. In this scenario, if a double read to this exact address follows on the next cycle, the result should consult the write buffer 18 instead of RAID bank 14, which would be out of date.

SUMMARY OF SCENARIOS IMPLEMENTING THE ARCHITECTURE

Write:

A write operation requires updating the write buffer 18 and ultimately updating (refreshing) the RAID bank's parity bit. During a write the write data to the array is either a "1" or a "0" and may consist of many bits of data. This data needs to be compared with the current parity bits stored in the RAID bank 14. One port issues the write and the other port issues a read to the other banks to read out the parity bits for a given address. The read data out from every other normal bank is XORed with the incoming write data in. The write updates the normal banks array on the same cycle and the result of the XOR (other bank's data out with write data in) needs to be stored in a write buffer 18 (latches L1/L2) until the RAID bank 14 is free to be updated. It is noteworthy to mention that during a write the parity bits for the given address may no longer be valid (i.e., previous parity bit was a "1" and now needs to be updated to a "0." If a double read follows immediately on the next cycle to the same address of the previous write (row, column) the read compares the data in the write buffer 18, e.g., latch L2, rather than the RAID bank 14 since the RAID bank 14 has not been written (refreshed). The RAID bank 14 can be updated when the user issues 1 read per cycle, a noop (no operation) or another write as these are cycles when the RAID bank resources are free. Once data is transferred from the write buffer 18 to the RAID bank 14 the write buffers contents are invalid and can be overwritten.

Single Read:

A single read operation will follow the typical memory array access and no special logic is required. This is a valid opportunity for the write buffer contents to update the RAID bank 14. Data from the bank read at a given row and column will be sent out on Q, and the data out latches as in a normal read operation.

Double Read:

In a double read operation with bank collision, the first read will proceed as a normal read operation and no special logic is required, data from the bank read at a given row and column will be sent out on Q, the data out latches. The second read requires reading all other banks (including RAID bank) and XOR all of the results. The result of this cascaded XOR is the data out for the bank read. By reading all other banks it is possible to determine what the correct data out should be. This data out will be sent through the data in latches 16, enabling two reads per cycle. In a double read operation with no bank collision (i.e. bank address of the first read is not the same as the bank address of the second read) then the first read will proceed as a normal read operation and no special logic is required, data from the bank read at a given row and column will be sent out on Q, the data out latches. For the second read with no bank collision, the data out from the second read must be sent through the XOR stack but the RAID bank 14 does not need to be read as a bit is not being reconstructed. In this scenario, the bank being read will put data stored in the array through the XOR tree, the other banks will simply output a "0" into each XOR gate. A "0" into an XOR gate will not flip the bit and hence the data out will be retain as it cascades through the XOR gates. The second read will be sent through the data in latches 16, enabling two reads per cycle.

In the event that a double read occurs with bank collision following a write cycle to the same address during both the write and read operation, the RAID bank 14 will be out of date. In this scenario, logic is added to the design which compares the pipelined addresses of the write with the read addresses of double read. In this manner, it is simple to understand if the RAID bank 14 needs to be read or if the parity bit is stored in the write buffer 18. One skilled in the art can come up with multiple implementations to do this comparison. In one example, XOR gates which compare the pipelined write address (i.e., bank, row, column, etc.) with the new read address (i.e., bank, row, column, etc.) could set a flag "ADDRESS_MATCH_P" in the event that all addresses match during a double read with a previous write.

Noop:

When the user issues a no operation on any given cycle, there is no special logic that needs to be added to handle the noop. The memory simply maintains its state. This is a valid opportunity for the write buffer contents to update the RAID bank.

The method(s) as described above is used in integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A memory array, comprising:
a plurality of memory banks each of which includes addressable storage units;
a redundant array of independent disks (RAID) bank which stores parity bits corresponding to data written into any of the plurality of memory banks at a same address; and
a plurality of XOR gates in which data written into any of the plurality of memory banks is cascaded therethrough to refresh the parity bits in the RAID bank.

2. The memory array of claim 1, wherein each of the plurality of memory banks is a multi port memory bank.

3. The memory array of claim 1, further comprising a write buffer structured to store the data written into any of the plurality of memory banks prior to being stored in the RAID bank.

4. The memory array of claim 3, wherein the write buffer comprises a plurality of latches.

5. The memory array of claim 4, wherein:
the plurality of latches comprises two latches enabling 1 cycle of writes;
a first of the two latches stores the data written as a parity bit corresponding to data written in a current write cycle; and
a second of the two latches stores the parity bit corresponding to data written in a previous write cycle.

6. The memory array of claim 5, wherein the parity bit in the second of the two latches updates the parity bits in the RAID bank for a same address in which data was written into a respective one of the plurality of memory banks.

7. The memory array of claim 6, further comprising a plurality of MUXes and a mux select pin (MUXSELP) signal which selects a first memory bank of the plurality of memory banks to reconstruct previously written data, by consulting the second of the two latches.

8. The memory array of claim 6, wherein the parity bit stored in the second of the two latches is cascaded through the plurality of XOR gates with data from all additional memory banks of the plurality of memory banks, in a double read of a single memory bank of the plurality of memory banks, to provide read data of an unread address in the single memory.

9. The memory array of claim 1, wherein the RAID bank is a duplicate structure of the plurality of memory banks.

10. The memory array of claim 1, wherein the plurality of memory banks and the RAID bank are configured such that a data error is determined when data is read out of any of the plurality of memory banks does not match a parity bit in the RAID bank for a same address.

11. A memory array, comprising:
a plurality of memory banks each of which includes addressable storage units;
a write buffer;
a plurality of XOR gates in which data written into any of the plurality of memory banks is cascaded therethrough to the write buffer; and
an additional memory bank which stores parity bits corresponding to data written into any of the plurality of memory banks at a same address in subsequent write cycles, as received from the write buffer during a write operation.

12. The memory array of claim 11, wherein the write buffer comprises a first latch and a second latch.

13. The memory array of claim 12, wherein:
the first latch receives data written into one of the plurality of memory banks which is cascaded through the XOR gates; and
the second latch receives the data written into the first latch during a subsequent write operation of any of the plurality of memory banks.

14. The memory array of claim 13, wherein the data written into the second latch updates the parity bits in the additional memory bank for a same address in which the data written into the second latch belongs in a respective one of the plurality of memory banks.

15. The memory array of claim 13, wherein the data written into the second latch is cascaded through the XOR gates in a double read of a single memory bank of the plurality of memory banks.

16. The memory array of claim 15, wherein the written data cascaded through the XOR gates in the double read of the single memory bank will correspond to the unread data in a second addressable storage unit of the single memory bank.

17. The memory array of claim 15, wherein the plurality of memory banks and the additional memory bank are configured such that no data error is determined when data is read out of any of the plurality of memory banks matches a parity bit in the RAID bank for a same address.

18. A method, comprising:
writing data into a memory bank of a plurality of memory banks;
cascading the write data of the memory bank and read data of other memory banks of the plurality of memory banks through a plurality of XOR gates;
storing the write data for the memory bank as a parity bit in a write buffer; and
refreshing another memory bank with a previous parity bit stored in the write buffer from a previous write operation performed on the memory bank or another memory bank.

19. The method of claim 18, wherein the write buffer includes a first latch and a second latch, the previous parity bit being initially stored in the first latch and then passed to the second latch in a subsequent write operation.

20. The method of claim 19, further comprising, in a double read occurrence of a single memory bank, reading data from each memory bank for a first address and the parity bit stored in the second latch, and cascading the read data and the parity bit stored in the second latch through the XOR gates, wherein an output of the XOR gate corresponds to data in a second address of the single memory bank which was not read.

* * * * *